Jan. 13, 1970   E. S. SNAVELY, JR   3,489,680
METHOD FOR BREAKING A WATER-IN-OIL EMULSION
Filed Oct. 30, 1967
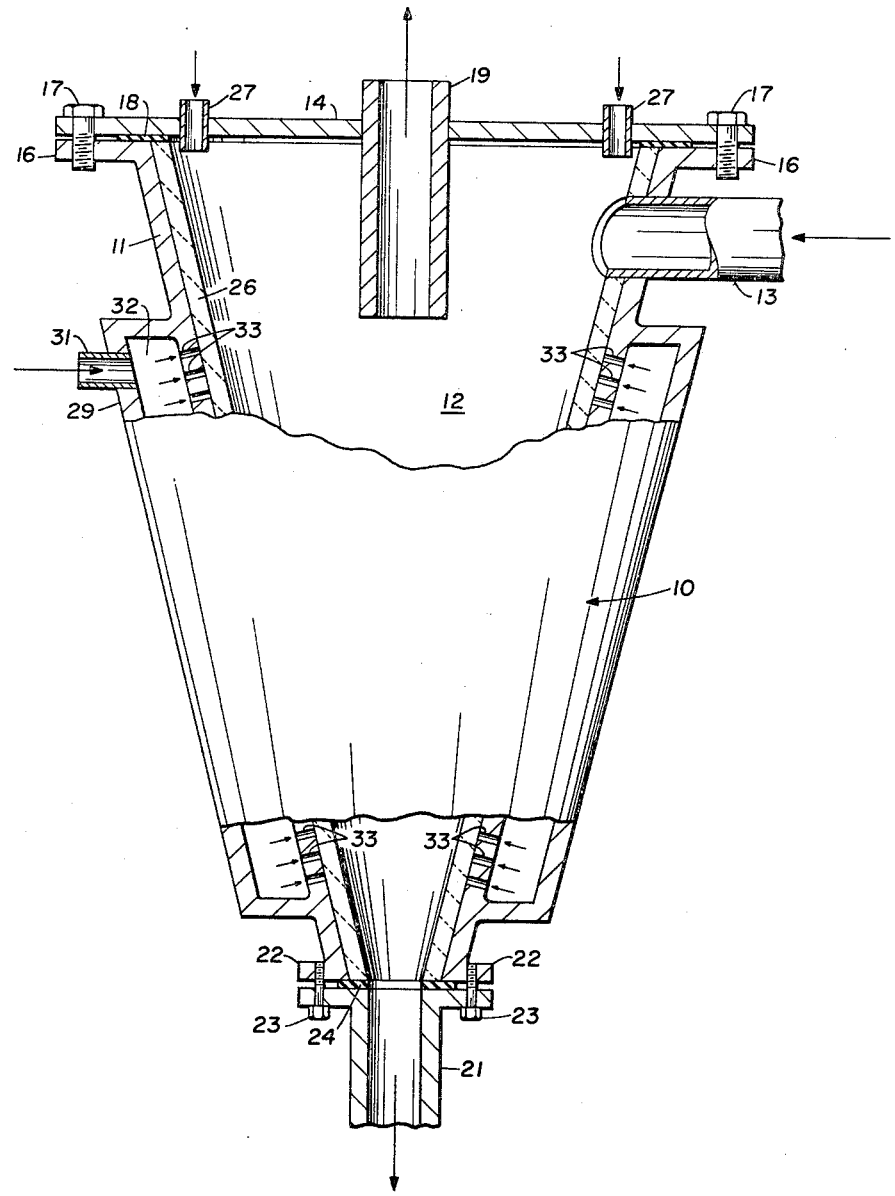
INVENTOR
*EARL S. SNAVELY, JR.*
By *Emil J. Bednar*
ATTORNEY

United States Patent Office 3,489,680
Patented Jan. 13, 1970

3,489,680
METHOD FOR BREAKING A WATER-IN-OIL EMULSION
Earl S. Snavely, Jr., Arlington, Tex., assignor to Mobil Oil Corporation, a corporation of New York
Filed Oct. 30, 1967, Ser. No. 679,137
Int. Cl. B01d 17/04
U.S. Cl. 210—23          8 Claims

ABSTRACT OF THE DISCLOSURE

A method for breaking a water-in-oil emulsion wherein the emulsion is injected tangentially into the upper portion of an inverted generally conical separation zone. The emulsion flows spirally downwardly at a velocity such that the resulting shear forces rupture the protective high-viscosity film about the dispersed water particles to form droplets of water. The droplets of water coalesce into a water phase upon contacting a coalescing membrane within the separation zone. The water phase moves along the membrane toward the apex of the separation zone from which it is removed as a stream. The oil phase is removed as a stream from the upper end of the separation zone. A demulsifier may be mixed with the fluids in contact with the membrane to enhance coalescing of the water droplets.

BACKGROUND OF THE INVENTION

Field of the invention

This invention relates to the separation of a water-in-oil emulsion into separate water and oil phases. More particularly, the present invention relates to the separation of such emulsions into water and oil phases by employing shear forces and a coalescing membrane.

Description of the prior art

In oil fields, water usually is produced with crude oil. The crude oil must generally be free of water before it can be sold and transported in pipelines. The complexity of separating mixtures of water and oil depends upon the physical form of the water. Where the mixture has only "free" water, the water will separate readily from the oil because of the differences in gravities of the water and oil. This type of separation presents no problem other than providing a vessel in which water-oil phase separation can occur. However, the water can be dispersed throughout the oil in very minute particles, usually with diameters less than 25 microns. This mixture may be termed an emulsion and is very difficult to separate into water and oil phases.

In these emulsions, the small particles of water are dispersed in the oil in a stable condition for several reasons. First, the area of the interface between oil and water in a stable emulsion is very substantial. For example, the interfacial area of one gallon of water dispersed within oil would range from about 1,000 to 300,000 square feet. The interfacial tension has a tendency to reduce the interfacial area to a minimum by coalescence of the water particles into larger droplets. However, the large interfacial area of the water in the oil is stabilized against coalescence by two factors in a stable emulsion. The minute size of the dispersed water is one factor to provide an atmosphere necessary for emulsion stability. The second factor is the presence of emulsifying agents or surfactants which completely coat the interfacial area to form a protective high-viscosity film that surrounds and stabilizes the dispersed water within the continuous oil phase. This film prevents the coalescence of the dispersed water in the emulsion into separate water and oil phases.

The breaking of emulsions in which water is dispersed in the continuous crude oil phase requires performing certain functions. Initially, the interfacial protective film surrounding the dispersed water within the emulsion must be weakened or destroyed. Then, the particles of water must coalesce into droplets of water which can undergo settling through the effects of gravity. Thereafter, the coalesced droplets of water are separated as a water phase from the oil phase.

Breaking of emulsions may be achieved by physical and chemical treatments, application of heat, and electrical methods. Generally, the methods for breaking a water-in-oil emulsion usually employ a combination of these treatments. In many instances, chemical demulsifiers may be employed for assisting in the breaking of the protective film which surrounds the dispersed water. The demulsifiers are added to the emulsion to counteract the effects of the emulsifiers which provide the stability of the dispersed water particles in the continuous oil phase. The demulsifier is uniformly distributed throughout the emulsion so as to be present at all interfaces between the water and oil before the emulsion is processed in a treating facility.

There are a multitude of complex chemical compositions which serve as demulsifiers for breaking water-in-oil emulsions. Surface-active materials have been used successfully as demulsifiers. The demulsifiers usually have a variety of polar components with a preferred solubility ranging from predominantly oil-soluble to predominantly water-soluble. As can be seen, an emulsifying agent stabilizes an emulsion which effect can be counteracted by a demulsifier.

The selection of a demulsifier for breaking a particular emulsion may be based upon actual tests and trials performed in the emulsion. Several methods are available to screen the demulsifiers. Usually the type of the demulsifier, and its amount in use, are best established by experimentation directly at the facility used to separate the emulsion into water and oil phases.

SUMMARY OF THE INVENTION

The present invention is a method for breaking a water-in-oil emulsion into water and oil phases by a plurality of coacting steps. The emulsion is injected tangentially into an upper portion of an inverted generally conical separation zone to flow downwardly in a spiral flow-path therein. The emulsion is injected at a velocity such that sufficient shear forces are exerted upon it to rupture the protective high-viscosity film which surrounds the dispersed water particles, thereby forming droplets of water. The emulsion and droplets of water, at the mentioned condition of shear forces exerted upon them, are contacted with a coalescing membrane disposed within the conical separation zone. The membrane coalesces the droplets of water into a water phase which moves along the membrane toward the apex of the separation zone. The water phase is removed as a stream from the apex of the separation zone. An oil phase is removed as a stream from the upper end of the separation zone.

DESCRIPTION OF THE DRAWING

The drawing is an elevation, partially in section, of a hydrocyclone which may be used for the practice of the steps of the present method in separating water-in-oil emulsions into water and oil phases.

DESCRIPTION OF SPECIFIC EMBODIMENTS

Referring to the drawing, there is shown a hydrocyclone in which the steps of the method of this invention can be practiced. More particularly, the term "hydrocyclone" is used to define an apparatus which has a separation chamber or zone wherein substances may be separated from one another through centrifugal and gravitational acceleration. Depending upon the particular construction of the hydrocyclone, the substances may be accelerated from five times gravity to 2500 times gravity depending upon the velocity of the substances moving spirally within the separation zone.

More particularly, the hydrocyclone 10 is formed of a rigid body 11 in which is formed a generally conical separation chamber or zone 12. The term "generally conical," as used herein, is intended to include frustoconical, or irregularly tapered, chambers having the effect of a cone, such as belled, semiellipsoidal, or paraboloidal, or hyperboloidal chambers. A feed inlet 13 extends nonradially into the body 11 to provide a tangential entry for fluids into the upper end of the separation zone 12. The upper end of the body 11 is enclosed by cover 14 which is secured to flange 16 on the body 11 by means of bolts 17. A gasket 18 between the cover 14 and the flange 16 seals the cover 14 to body 11 in a fluidtight connection. An overflow outlet 19 extends coaxially through the cover 14 into the body 11. The overflow outlet 19 may be termed a vortex finder since it generally extends within the separation zone 12 into that portion of the fluid therein which is subjected to the least effect of centrifugal acceleration. An axially aligned base outlet 21 is secured to the lower end or apex of the separation zone 12. The base outlet 21 is secured to flange 22 on the body 11 by bolts 23. A gasket 24 between the flange 22 and the base outlet 21 provides a fluidtight connection. The hydrocyclone 10 so far described will be recognized to be conventional in construction. The hydrocyclone 10 may be of other equivalent construction, if desired.

For use in the present method, the hydrocyclone 10 is provided also with a membrane 26 which is disposed within the conical separation zone 12. More particularly, the membrane 26 is mounted upon the inner surface of the body 11 and surrounds the outer periphery of the separation zone 12. The cover 14 and outlet 21 secure the membrane 26 within the body 11. However, any suitable means may be employed for mounting and securing the membrane 26 within the body 11.

The membrane 26 is formed of a material which provides a structure for coalescing droplets of water, once they are formed, into a water phase in the presence of oil. In the present method, the membrane 26 is a porous solid having a large surface-to-volume ratio, and a plurality of uniformly small passages. Additionally, the solid is preferentially wetted by water in the presence of oil. Any solid which performs this function may be employed as the membrane 26. For example, the membrane 26 may be selected from the group of solids consisting of porous silica, cellulose liners, synthetic resin liners formed of a polyalcohol, a polyether, or a polyester polymer. Additionally, inert fibrous liners coated with substances which make the fibers preferentially wetted by water in the presence of oil may be employed as the membrane 26. Specifically, the membrane 26 may be formed by a layer of granular solids such as sand and diatomaceous earth held in place by an inert resin binder. Additionally, fibrous materials such as Fiberglas (TM), steel wool, copper turnings, and like filaments may be employed. Additionally, the rock mineral wood coated with resins to provide a self-supporting structure and a preferential wetting by water in the presence of oil may be employed.

Improved coalescence of the droplets of water released from the emulsion is provided by employing an inert solid which is porous and has a plurality of capillary-sized passages which permit a ready flow of water therethrough but which develop strong interfacial films to block the passages to the flow of oil therethrough. For example, unglazed rigid forms of silica or ceramic materials having capillary-sized passages which make the solid predominantly hydrophilic may be employed. The membrane 26 is preferably formed of such a porous ceramic material. Naturally, the membrane 26 must be provided with a sufficient rigidity to withstand destruction from the forces contained within the hydrocyclone 10 during normal operation.

Auxiliary inlets 27 are provided through the cover 14 so that fluids may be passed into the separation zone 12 to mix with the emulsion in contact with the membrane 26.

In the present method, a water-in-oil emulsion to be separated into separate water and oil phases may be obtained from any source. For example, the emulsion may be a water-in-crude oil emulsion obtained from production wells in an oil field which has been subjected to production stimulation by a steam push-pull procedure. In such cases, very "tight" water-in-crude oil emulsions are formed which are relatively difficult to separate into water and oil phases by conventional methods. However, the method of the present invention is well suited for breaking these emulsions and separating them into water and oil phases.

As a first step of the present method, the emulsion is injected tangentially through the feed inlet 13 into the separation zone 12. The emulsion flows in a downwardly spiral flow-path through the separation zone 12. The emulsion is injected into the separation zone at a velocity such that sufficient shear forces are exerted upon the emulsion to rupture the protective high-viscosity film which surrounds the dispersed water particles. At this condition of shear forces, free droplets of water are formed which droplets may be separated from the other fluids by gravitational acceleration if desired. The velocity required to provide these shear forces in the emulsion may be readily calculated from the forces obtained at a given velocity of tangential flow and the nature of the fluid phases in the emulsion. If desired, the velocity that produces such shear forces may be determined experimentally. For example, the emulsion may be passed by a suitable pumping means through the fluid inlet 13 at different velocities until the required shear forces are obtained.

The emulsion and droplets of water, at the mentioned condition of shear forces exerted upon them, are contacted with the coalescing membrane 26 within the separation zone 12. The spiral flow path of the emulsion carries the droplets of water across the exposed face of the membrane 26. The membrane 26, because of its hydrophilic nature, coalesces the droplets of water into a water phase which moves along the membrane 26 toward the base outlet 21 at the apex of the separation zone 12. The water phase may move through the membrane 26, or as a film along its surface exposed to the emulsion. Usually, the water phase moves by both functions along the membrane 26.

The water phase coalesced upon the membrane 26 is removed as an underflow stream through the base outlet 21. The oil phase at the overflow outlet 19 within the separation zone 12 is, for practical purposes, free of water in the hydrocyclone 10. Thus, the oil phase is removed as a stream through the overflow outlet 19 from the upper end of the separation zone 12. Thus, the emulsion has been separated by the present method into separate oil and water phases through the use of a hydrocyclone 10 in conjunction with the membrane 26. This result is obtained without the complex treatments normally used for this purpose.

In some circumstances, it may be desirable to reduce the severity of the operating conditions which produce sufficient shear forces to break the protective film surrounding the dispersed water in the emulsion. For example, operation of the hydrocyclone 10 may require injection of certain emulsions at undesirably high velocities with the membrane 26 formed of certain materials. In such cases, the emulsion and droplets of water, which are produced at the mentioned condition of shear forces exerted on them, are contacted with the coalescing membrane 26 in the presence of a demulsifier. For this purpose, a demulsifier is passed through auxiliary inlets 27 into the separation zone 12 to mix with the emulsion and droplets of water in contact with the membrane 26. By this means, the droplets of water are coalesced at greater rates into the water phase which then flows along the membrane 26. Otherwise, the practice of the method of the present invention is in accordance with the earlier described embodiment.

In another operation of the hydrocyclone 10, the demulsifier is applied uniformly to most of the exterior surface of the membrane 26. For this purpose, the body 11 is surrounded in integral connection with a spaced outer wall 29 so that therebetween is formed an enclosed chamber 32. A sidewall inlet 31 is provided in the wall 29 so that fluids can be passed into the chamber 32. A plurality of ports 33 traverse the body 11 which is interposed between the chamber 32 and the membrane 26.

With the foregoing construction, a demulsifier is passed through the inlet 31 to fill the chamber 32. Then, the demulsifier flows through the ports 33 to infuse the membrane 26. The demulsifier in the membrane 26 mixes with the emulsion and droplets of water in contact therewith. As a result, the droplets of water are coalesced at greater rates into a water phase which then flows along the membrane 26.

If desired, the ports 33 may connect to any portion of the membrane 26 from the chamber 32. However, better results are obtained by having the ports 33 always connect with the lower portion of the membrane 26 in which the water droplets are most concentrated. Otherwise, the method of this invention is practiced in accordance with the first-described embodiment.

The demulsifier may be any one selected from those which can be employed to assist in the breaking and separating of water and oil phases from emulsions. Preferably, the demulsifier is selected from the group consisting of ethoxylated nonylphenol, alkylaryl polyether alcohol, and polyethylene hydrogenated tallow amide. Additionally, the demulsifier is readily employed when it is in the form of an aqueous solution of a surfactant which can counteract the emulsifier stabilizing the dispersed water in the oil phase of the emulsion.

A demulsifier selected from the following listed materials may be employed in the present invention to good advantage. These demulsifiers are petroleum sulfonates, ethylene oxide adducts of alkyl or aryl alcohols and ethoxylated castor oil.

What is claimed is:

1. A method for breaking a water-in-oil emulsion into water and oil phases, comprising the steps of:
    (a) injecting the emulsion tangentially into an upper portion of an inverted generally conical separation zone to flow downwardly in a spiral flow path therein, said emulsion being injected at a velocity such that sufficient shear forces are exerted upon the emulsion to rupture the protective high-viscosity film which surrounds the dispersed water thereby forming droplets of water in a continuous oil phase;
    (b) contacting the emulsion and droplets of water at the mentioned condition of shear forces exerted thereon with a hydrophilic coalescing membrane disposed within said conical separation zone, said membrane coalescing the droplets of water into a water phase which moves along the membrane toward the apex of said separation zone; and
    (c) removing the water phase as a stream from the apex of said separation zone and an oil phase as a stream from the upper end of said separation zone.

2. The method of claim 1 wherein the membrane is a porous solid having a large surface-to-volume ratio, a plurality of uniformly small passages, and said solid is preferentially wetted by water in the presence of oil.

3. The method of claim 2 wherein the membrane is selected from the group of solids consisting of porous silica, cellulose liners, synthetic resin liners formed of polymers of a polyalcohol, a polyether, and a polyester, and inert fibrous liners coated with substances which make the liners preferentially wetted by water in the presence of oil.

4. The method of claim 2 wherein the solid is an inert porous substance having a plurality of capillary-sized passages which permit a ready flow of water therethrough but which develop strong interfacial films to block the passages to the flow of oil.

5. The method of claim 1 wherein a demulsifier is passed into the separation zone to mix with the emulsion and droplets of water in contact with the membrane whereby the coalescing of the droplets of water into a water phase is enhanced.

6. The method of claim 5 wherein the demulsifier is selected from the group consisting of ethoxylated nonylphenol, alkylaryl polyether alcohol, polyethylene hydrogenated tallow amide, petroleum sulfonates, ethylene oxide adducts of alkyl or aryl alcohols and ethoxylated castor oil.

7. The method of claim 5 wherein the demulsifier is an aqueous solution of a surfactant capable of counteracting the effect of the emulsifier which stabilizes the dispersed water in the emulsion.

8. The method of claim 5 wherein the demulsifier is passed through said membrane into said conical separation zone to mix with the emulsion and droplets of water in contact with the membrane whereby the coalescing of the droplets of water into a water phase is enhanced.

References Cited

UNITED STATES PATENTS

| | | | |
|---|---|---|---|
| 1,291,857 | 1/1919 | Hankar | 210—512 |
| 2,180,811 | 11/1939 | King | 210—512 X |
| 2,207,399 | 7/1940 | Gaertner | 210—304 X |
| 2,236,629 | 4/1941 | Parker | 210—512 |
| 2,477,318 | 7/1949 | Stevenson | 210—209 X |
| 3,127,255 | 3/1964 | Winslow | 210—304 X |
| 3,391,787 | 7/1968 | Salomon | 210—512 X |

REUBEN FRIEDMAN, Primary Examiner

F. A. SPEAR, JR., Assistant Examiner

U.S. Cl. X.R.

210—65, 304, 512